United States Patent
Zhang et al.

(10) Patent No.: US 8,791,654 B2
(45) Date of Patent: Jul. 29, 2014

(54) PULSE WIDTH MODULATION CIRCUIT AND ILLUMINATION APPARATUS

(75) Inventors: Jun-Wei Zhang, Guangdong (CN); Jun Zhang, Guangdong (CN); Tsung-Jen Chuang, New Taipei (TW); Shih-Fang Wong, New Taipei (TW); Qi-Long Yu, Shenzhen (CN); Chia-Hung Chien, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 401 days.

(21) Appl. No.: 13/278,070

(22) Filed: Oct. 20, 2011

(65) Prior Publication Data
US 2013/0026939 A1      Jan. 31, 2013

(30) Foreign Application Priority Data
Jul. 27, 2011   (CN) .......................... 2011 1 0211883

(51) Int. Cl.
H05B 37/00        (2006.01)

(52) U.S. Cl.
USPC .......................................... 315/307; 315/224

(58) Field of Classification Search
USPC .......................... 315/291, 224, 307, 308, 246
See application file for complete search history.

(56) References Cited

U.S. PATENT DOCUMENTS 6,169,375 B1 *    1/2001   Moisin ........................ 315/291
2006/0273734 A1 * 12/2006  Inoue .......................... 315/129

* cited by examiner

Primary Examiner — David H Vu
(74) Attorney, Agent, or Firm — Novak Druce Connolly Bove + Quigg LLP

(57) ABSTRACT

An illumination apparatus includes a power supply, a pulse width modulation (PWM) circuit, a switching unit, and an illuminating unit. The power supply supplies a supply voltage to the PWM circuit and the illuminating unit. The PWM circuit outputs a first level voltage by being fully charged by the voltage of the power supply and outputs a second level voltage by being fully discharged. The switching unit is turned off according to the first level voltage and controls the illuminating unit to stop emitting light. The switching unit is turned on according to the second level voltage and controls the illuminating unit to emit light.

19 Claims, 2 Drawing Sheets

PULSE WIDTH MODULATION CIRCUIT AND ILLUMINATION APPARATUS

BACKGROUND

1. Technical Field

The present disclosure relates to illumination apparatuses, particularly relates to a pulse width modulation circuit and an illumination apparatus.

2. Description of Related Art

Light emitting diodes (LEDs) are widely used in various electronic devices, such as a backlight module of a liquid crystal display (LCD). In some LCDs, a constant current from a power supply is used for driving the LEDs to emit light. However, when such LEDs emit light for a long time, the temperature of the PN junction of the LEDs may get too high and the brightness and uniformity of the LEDs emitted light may be reduced.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
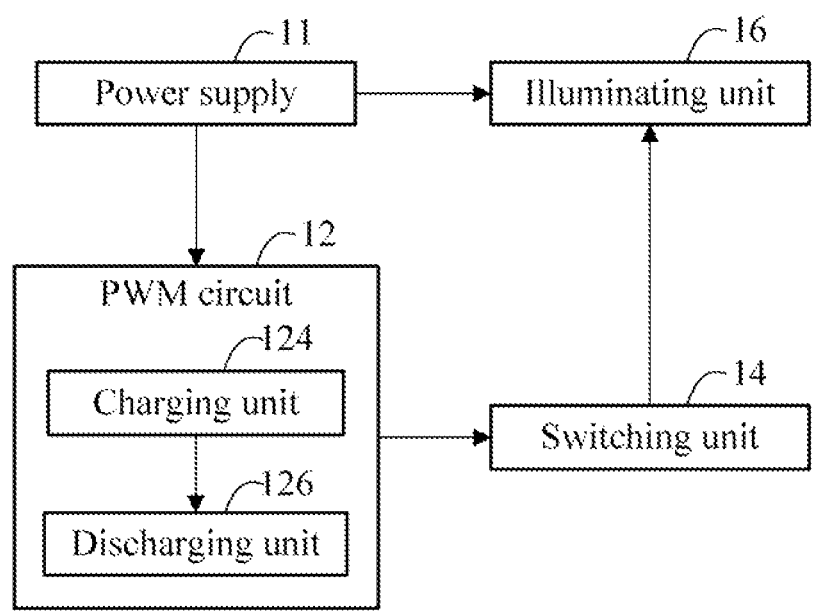
FIG. 1 is a block diagram of an illumination apparatus in accordance with one embodiment.

Referring to FIG. 1, an illumination apparatus 100 includes a power supply 11, a pulse width modulation (PWM) circuit 12, a switching unit 14 and an illuminating unit 16. In the embodiment, the illumination apparatus 100 can be used as a backlight module of a liquid crystal display (LCD). In other embodiments, the power supply 11 is external of the illumination apparatus 100.

The power supply 11 provides a supply voltage to the PWM circuit 12 and the illuminating unit 16.

The PWM circuit 12 generates a pulse voltage according to the supply voltage. In this embodiment, the duty cycle of the pulse voltage is adjustable. The pulse voltage of the PWM circuit 12 includes a first level voltage and a second level voltage. In the embodiment, the first level voltage is logic low voltage level and the second level voltage is logic high voltage level. The PWM circuit 12 includes a charging unit 124 and a discharging unit 126.

The charging unit 124 is connected to the power supply 11, the discharging unit 126 and the switching unit 14. The charging unit 124 generates the first level voltage when being charged by the supply voltage of the power supply 11.

The discharging unit 126 is connected to the power supply 11 and the switching unit 14. The discharging unit 126 generates the second level voltage when the charging unit 124 discharges via the discharging unit 126.

The switching unit 14 is turned off according to the first level voltage and controls the illuminating unit 16 to stop emitting light. The switching unit 14 is turned on according to the second voltage and controls the illuminating unit 16 to emit light.

The illuminating unit 16 includes a plurality of LEDs.

Figure 2:
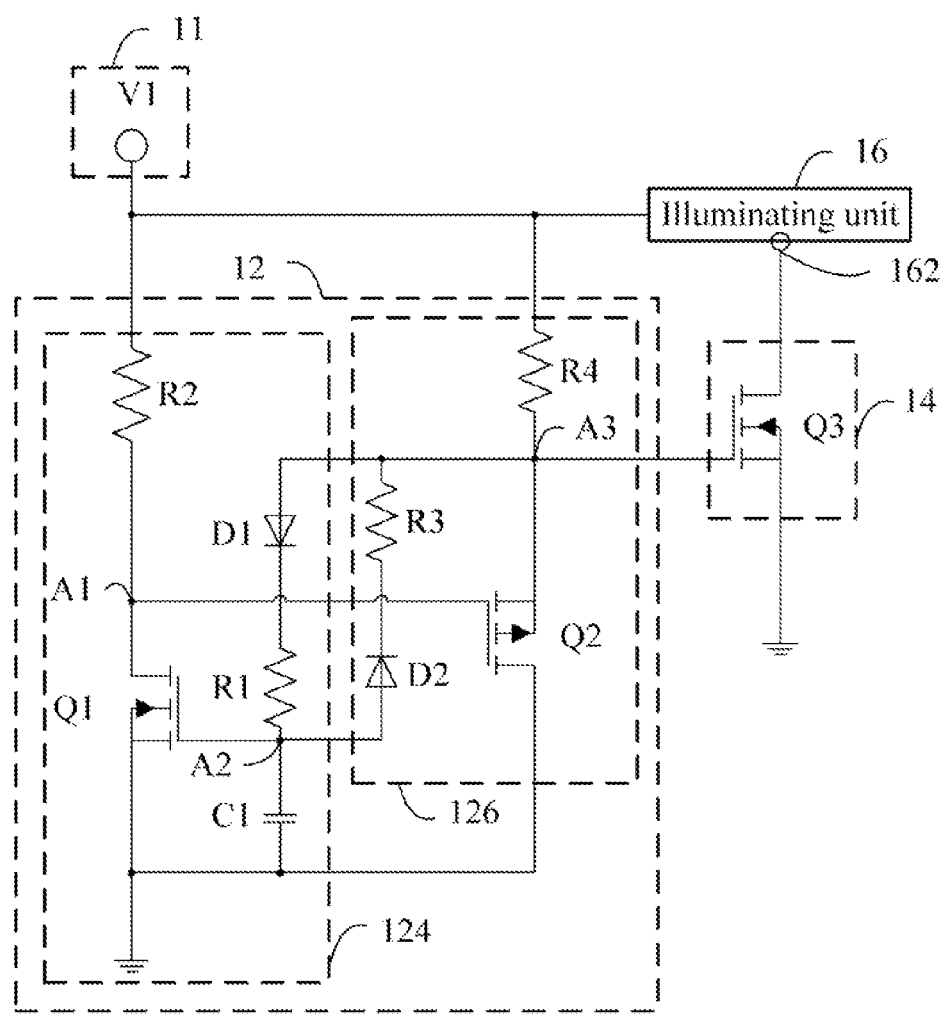
FIG. 2 is a circuit diagram of the illumination apparatus of FIG. 1 in accordance with one embodiment.

Referring to FIG. 2, the power supply 11 includes a power terminal V1. The power terminal V1 provides supply voltage to the PWM circuit 12 and the illuminating unit 16.

The charging unit 124 includes a first diode D1, a first resistor R1, a second resistor R2, a first transistor Q1, a capacitor C1, a first node A1, and a second node A2. The cathode of the first diode D1 is connected to the second node A2 through the first resistor R1. The anode of the first diode D1 is connected to the discharging unit 126. A gate of the first transistor Q1 is connected with the second node A2. A drain of the transistor Q1 is connected to the power terminal V1 through the first node A1. A source of the first transistor is grounded. The second resistor R2 is connected between the power terminal V1 and the first node A1. The capacitor C1 is connected between the gate and the source of the first transistor Q1. In the embodiment, the first transistor Q1 is an n-channel enhancement type metal oxide semiconductor field effect transistor.

The discharging unit 126 includes a second diode D2, a third resistor R3, a fourth resistor R4, a second transistor Q2, and a third node A3. The cathode of the second diode D2 is connected to the third node A3 through the third resistor R3. The anode of the second diode D2 is connected to the second node A2. A gate of the second transistor Q2 is connected to the first node A1. A source of the second transistor Q2 is connected to the third node A3. A drain of the second transistor Q2 is grounded. In the embodiment, the second transistor Q2 is a p-channel enhancement type metal oxide semiconductor field effect transistor. In this embodiment, the resistance of the first resistor R1, the third resistor R3, and the capacitance of the capacitor C1 are adjustable.

The switching unit 14 includes a third transistor Q3. A gate of the third transistor Q3 is connected to the third node A3. A drain of the third transistor Q3 is connected to the illuminating unit 16. A source of the third transistor Q3 is grounded. In the embodiment, the third transistor Q3 is an n-channel enhancement type metal oxide semiconductor field effect transistor.

The illuminating unit 16 includes a port 162. The port 162 is connected to the drain of the third transistor Q3.

The principle of the illumination apparatus 100 is illustrated as follows:

When the power terminal V1 is powered on, the difference in voltage of the cathode and the anode of the first diode D1 is greater than 0.7V. The first diode D1 is turned on and the first capacitor C1 is charged by the supply voltage of the power terminal V1. The difference in voltage of the cathode and the anode of the second diode D2 is less than 0.7V, the second diode D2 is turned off. When the first capacitor C1 is fully charged, the difference in voltage between the gate and the source of the first transistor Q1 is greater than the 0V and the first transistor Q1 is turned on. The first node A1 is almost equal to 0V. The difference in voltage of the gate and the source of the second transistor Q2 is less than 0V, the second transistor Q2 is turned on. The third node A3 is almost equal to 0V. The difference in voltage of the gate and the source of the third transistor Q3 is less than 0V, the third transistor Q3 is turned off. The port 162 stops receiving the voltage of the power terminal V1. The illuminating unit 16 stops emitting light. Therefore, the temperature of the PN junction of the LEDs can be reduced.

The charging time of the capacitor C1 can be calculated according to the following formula:

$$V_t = V * \left[1 - \exp\left(-\frac{t}{RC}\right)\right].$$

In the above formula, $V_t$ is the voltage of the capacitor C1, V is the voltage of the power terminal V1, t is the charging time, C is the capacitance of the capacitor C1, R is the resistance of the resistor R1. When the charging time t is equal to the value of 5RC, the voltage of the capacitor C1 is 0.99V1. The charging process is almost completed.

When the third node A3 is equal to 0V, the capacitor C1 discharge via the second diode D2. The difference in voltage of the cathode and the anode of the second diode D2 is greater than 0.7V, the second diode D2 is turned on. The difference in voltage of the cathode and the anode of the first diode D1 is less than 0.7V, the first diode D1 is turned off. When the difference in voltage of the gate and the source of the first transistor Q1 is less than 0V, the first transistor Q1 is turned off. The first node A1 is equal to the voltage of the power terminal V1. The voltage of the third node A3 is also equal to the voltage of the power terminal V1. The difference in voltage of the gate and the source of the second transistor Q2 is greater than 0V, the second transistor Q2 is turned off. The difference in voltage of the gate and the source of the third transistor Q3 is greater than 0V, the third transistor Q3 is turned on. The port 162 receives the voltage of the power terminal V1. The illuminating unit 16 emits light.

The discharging time of the capacitor C1 can be calculated according to the following formula:

$$V_t = V * \exp\left(-\frac{t}{RC}\right).$$

In the above formula, $V_t$ is the voltage of the capacitor C1, V is the voltage of the power terminal V1, t is the discharging time, C is the capacitance of the capacitor C1, R is the resistance of the resistor R3. When the discharging time t is equal to the value of 5RC, the voltage of the capacitor C1 is 0.006V1. The discharging process is almost completed.

The duty cycle of the PWM circuit 12 can be adjusted through the resistance of the first resistor R1 and the second resistor R2. The emitting light frequency of the illuminating unit 16 is more than 50 HZ.

As described, the temperature of the PN junction of the LEDs can be reduced. Therefore, the brightness and the uniformity of the LEDs are improved.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An illumination apparatus being powered by a supply voltage of a power supply, the illumination apparatus comprising:
   a pulse width modulation (PWM) circuit for receiving the supply voltage connected to the power supply;
   a switching unit; and
   an illuminating unit adapted to emit light;
   wherein the PWM circuit outputs a first level voltage when being fully charged by the supply voltage, the switching unit is turned off according to the first level voltage and controls the illuminating unit to emit light, the PWM circuit outputs a second level voltage when fully discharged, the switching unit is turned on according to the second level voltage and controls the illuminating unit to stop emitting light.

2. The illumination apparatus of claim 1, wherein the PWM circuit comprises a charging unit connected to the switching unit, the charging unit is used for being charged by the supply voltage and generating a first level voltage when the charging process is completed.

3. The illumination apparatus of claim 2, wherein the PWM circuit further comprises a discharging unit connected to the charging unit and the switching unit; the discharging unit generates a second level voltage when the charging unit is fully discharged via the discharging unit.

4. The illumination apparatus of claim 3, wherein the charging unit comprises a first diode, a first resistor, a second resistor, a first transistor, and a capacitor; the anode of the first diode is connected to the power supply, the cathode of the first diode is connected to a gate of the first transistor via the first resistor a drain of the first transistor is connected to the power supply via the second resistor; a source of the first transistor is grounded, the capacitor is connected between the gate and the source of the first transistor.

5. The illumination apparatus of claim 4, wherein the discharging unit comprises a second diode, a third resistor, a fourth resistor and a second transistor; the anode of the second diode is connected between the gate of the first transistor and the capacitor, the cathode of the second diode is connects to the power supply via the third resistor and the fourth resistor; a gate of the second transistor is connected to the drain of the first transistor, a source of the second transistor is connected to the power supply via the fourth resistor, the source of the second transistor is further connected to the switching unit, a drain of the second transistor is grounded.

6. The illumination apparatus of claim 5, wherein the first transistor is an n-channel enhancement type metal oxide semiconductor field effect transistor; the second transistor is a p-channel enhancement type metal oxide semiconductor field effect transistor.

7. The illumination apparatus of claim 5, wherein the resistance of the first resistor and the third resistor are adjustable and the capacitance of the capacitor is adjustable; the lighting frequency of the illuminating unit is more than 50 HZ.

8. The illumination apparatus of claim 1, wherein the switching unit comprises a third transistor, a gate of the third transistor is connected to the PWM circuit, a drain of the third transistor is connected to the illuminating unit, a source of the third transistor is grounded.

9. The illumination apparatus of claim 8, the third transistor is an n-channel enhancement type metal oxide semiconductor field effect transistor.

10. The illumination apparatus of claim 1, wherein the first level voltage is logic low voltage level, the second level voltage is logic high voltage level.

11. A pulse width modulation (PWM) circuit being powered by a power supply controlling a switching unit to be turned on or turned off, the PWM circuit comprising:
    a charging unit adapted to generate a first level voltage when being fully charged by the power supply, the switching unit being turn off according to the first level voltage; and a discharging unit adapted to generate a second level voltage when the charging unit fully discharges via the discharging unit, the switching unit being turned on according to the second level voltage.

12. The PWM circuit of claim 11, wherein the charging unit comprises a first diode, a first resistor, a second resistor, a first transistor, and a capacitor; the anode of the first diode is connected to the power supply, the cathode of the first diode is connected to a gate of the first transistor via the first resistor a drain of the first transistor is connected to the power supply via the second resistor, a source of the first transistor is grounded, the capacitor is connected between the gate and the source of the first transistor.

13. The PWM circuit of claim 12, wherein the discharging unit comprises a second diode, a third resistor, a fourth resistor and a second transistor; the anode of the second diode is connected between the gate of the first transistor and the capacitor, the cathode of the second diode is connected to the power supply via the third resistor and the fourth resistor; a gate of the second transistor is connected to the drain of the first transistor, a source of the second transistor is connected to the power supply via the fourth resistor, the source of the second transistor is further connected to the switching unit, a drain of the second transistor is grounded.

14. The PWM circuit of claim 13, wherein the resistance of the first resistor and the third resistor are adjustable and the capacitance of the capacitor is adjustable, such that the duty cycle of the second level voltage and the first level voltage can be adjusted.

15. The PWM circuit of claim 13, wherein the first transistor is an n-channel enhancement type metal oxide semiconductor field effect transistor and the second transistor is an n-channel enhancement type metal oxide semiconductor field effect transistor.

16. The PWM circuit of claim 11, wherein the switching unit comprises a third transistor, a gate of the third transistor is connected to the PWM circuit, a drain of the third transistor is connected to the illuminating unit, a source of the third transistor is grounded.

17. The PWM circuit of claim 16, wherein the third transistor is an n-channel enhancement type metal oxide semiconductor field effect transistor.

18. The PWM circuit of claim 11, wherein the first level voltage is a logic low voltage level, the second level voltage is a logic high voltage level; the duty cycle of the pulse voltage is more than 50 Hz.

19. An illumination apparatus being powered by a supply voltage of a power supply, the illumination apparatus comprising:
    a pulse width modulation (PWM) circuit connected to the power supply; the PWM circuit comprising a charging unit and a discharging unit;
    a switching unit; and
    an illuminating unit adapted to emit light;
    wherein the charging unit generates a first level voltage when being fully charged by the power supply, the switching unit is turned off according to the first level voltage and controls the illuminating unit to emit light, the discharging unit generates a second level voltage when the charging unit fully discharges via the discharging unit, the switching unit is turned on according to the second level voltage and controls the illuminating unit to stop emitting light.

* * * * *